United States Patent

Hobbs

[15] 3,657,791

[45] Apr. 25, 1972

[54] SEPARATING DICED PLATE MATERIAL

[72] Inventor: Kenneth Hobbs, Bassett, England

[73] Assignee: U.S. Philips Corporation

[22] Filed: Nov. 26, 1969

[21] Appl. No.: 880,172

[30] Foreign Application Priority Data

Nov. 29, 1968 Great Britain......................32,166/68

[52] U.S. Cl.............................29/239, 29/200 P, 29/203 D, 29/413, 225/96.5, 269/6, 279/114

[51] Int. Cl.........................................................B25b 27/00

[58] Field of Search..................269/6, 58, 48, 48.1; 279/71, 279/104, 114; 214/10.5; 29/200 P, 203 P, DIG. 42, 413, 239; 225/2, 96, 96.5

[56] References Cited

UNITED STATES PATENTS 2,390,139 12/1945 Vasselli.........................29/203 P UX 2,993,701 7/1961 Arnold.................................279/114

3,025,743 3/1962 Cecchi..............................279/114 X 3,439,402 4/1969 Chin et al............................29/203 P 3,447,224 6/1969 Helda.................................29/203 P

*Primary Examiner*—Frank T. Yost
*Attorney*—Frank R. Trifari

[57] ABSTRACT

A device for use in extending a foil having a diced semiconductor wafer provided thereon. The device is provided with an annular scroll plate arranged for rotatable movement within a casing. A plurality of jaws are arranged about said scroll plate and are provided with means for attachment to a peripheral part of the foil. The jaws are provided with a ball bearing which cooperates with grooves in the scroll plate angularly oriented with respect to a radial line so that when the scroll is caused to rotate, the jaws will be advanced or withdrawn in a radial direction, thus causing extension of the foil and separation of the diced semiconductors.

7 Claims, 3 Drawing Figures

INVENTOR.
KENNETH HOBBS
BY
[signature]
AGENT

INVENTOR.
KENNETH HOBBS
BY
[signature]
AGENT

SEPARATING DICED PLATE MATERIAL

THIS INVENTION relates generally to methods of separating into pieces a plate of material in which the plate is secured on one major surface of a foil of synthetic resin and divided into pieces. The invention relates particularly, but not exclusively, to methods of separating semiconductor wafers into semiconductor wafers.

The latter methods are used in the manufacture of semiconductor devices, for example transistors and integrated circuits. The invention further relates to apparatus in the form of scroll chucks suitable for use in some such methods.

In British Pat. application No: 32166/68 there is described and claimed a method of severing a semiconductor wafer, in which the wafer is secured on a foil of synthetic resin and is divided into a plurality of parts by severing along a number of grooves formed in the surface of the wafer remote from the foil, whereafter the foil is extended so that the severed wafer parts secured on the foil are permanently spaced apart.

In said application there is further described and claimed an apparatus for carrying out such a method comprising a chamber having an opening defining a ledge for supporting the periphery of a foil on the inner part of which a plurality of severed but unspaced semiconductor wafer parts are present, means for sealing the periphery of said foil on said ledge in air-tight manner, means for applying a sub-atmospheric pressure within the chamber so sealed by the foil, heating means situated externally of the chamber for irradiating the foil, and a platform situated within the chamber for receiving the inner part of foil bearing wafer parts which are mutually separated on extension of said part of the foil into the chamber by irradiation of the foil, and application of said sub-atmospheric pressure.

Such methods when carried out using such apparatus as is described in the above mentioned application have substantial advantage over the previously known method described therein, but they tend to produce several further difficulties and disadvantages.

The extension of the foil results from sucking the foil into the sub-atmospheric pressure chamber in a manner similar to that of a bubble. Local weaknesses in the foil may lead to a non-uniform extension of the foil and in severe cases may cause punctures. Because the foil is moving in three dimensions, such punctures are likely to scatter the wafer parts throughout the chamber. To reduce the effect of these local weaknesses, the surface area of the foil undergoing extension may be reduced, but this would necessitate a reduction in wafer size which is technologically undesirable for semiconductor devices. An alternative to reducing the surface area is to use a comparatively thick foil, for example of 0.12 mm. thickness of material available commercially under the Trade Mark "Genotherm 100". Such thickness is however approximately equal to the thickness of a semiconductor wafer, and this raises problems, for instance when fracturing the semiconductor wafer into component wafer parts by the bending moment roller method to be described hereinafter.

When the foil is sucked into the chamber, it is desirous to deposit the portion of the foil having the wafer parts secured thereto on a platform situated within the chamber. Occasionally this does not occur, the said portion of the foil missing the platform with the result that the wafer parts usually are irrecoverable. In addition, it is desirous for the platform surface on which the foil and wafer parts are deposited to be a flat plane; such a surface facilitates the ready removal of the wafer parts. During the extension of the foil, the major foil surfaces are curved so that wafer parts originally arranged in straight rows on the unextended foil are deposited in curved rows on the extended foil on the chamber platform. Such curved rows of wafer parts are less convenient for removal than corresponding straight rows.

Heating of the foil when using the known apparatus is usually commenced prior to the evacuation of the chamber. Such a procedure produces a slight sagging of the foil by thermal expansion prior to the major extension by sucking. This slight sagging can cause side contact between wafer parts which may result in damage to the side of the wafer parts. Furthermore such contact may weaken the electrostatic attraction by which the wafer parts are normally attached to the foil, hence detaching one or more of the wafer parts.

The heating means for irradiating the foil is situated externally of the chamber so that the heating of the foil is effected by irradiating the Same major surface of the foil as that on which are situated the wafer parts. It is also usual for the major surfaces of the semiconductor wafer to be highly polished, and this results in their being highly reflective to radiation. The most important portion of the foil for stretching and hence heating, is the portion on which the wafer parts are situated. Consequently substantial irradiation and comparatively high temperatures are required to heat adequately this portion of the foil, and this may result in the wafer parts adhering to the foil. This may complicate either the mutual spacing of the wafer parts on extension of the foil, or their subsequent removal from the foil.

According to a first aspect of the invention, in a method of separating into pieces a plate of material, the plate is held on one major surface of a foil of synthetic resin and divided into pieces, whereafter the foil is held in a substantially flat plane and extended substantially linearly in said plane so that the said pieces held on the one major surface of the foil are spaced apart.

The extension of the foil substantially linearly in a substantially flat plane eliminates or reduces several of the above-mentioned disadvantages. Since the major surfaces of the foil are not deliberately curved during extension, an originally straight row of the said pieces on the unextended foil remains substantially straight on the extended foil, so facilitating removal of the said pieces. Since the foil is not moving in three dimensions during the extension, effects of a puncture in the foil need not be severe. The difficulty of a portion of the foil moving in three dimensions being wholly deposited on a certain fixed platform is also removed. The effect of local weaknesses in the foil is reduced compared with the three dimensional strain imposed by the previously described method and apparatus. This permits the use of a thinner foil and/or one with a larger surface area.

Since the method is particularly advantageous for semiconductor technology, the plate may be a semiconductor wafer and the said pieces may be semiconductor wafer parts. This enables the method to be used for separating wafers having a relatively large diameter. Wafers of large diameter are more economic when it is considered that more wafer parts and hence semiconductor devices can be accommodated, and the number of processing steps is the same as that used for a smaller wafer. In addition the arrangement of the spaced wafer parts in substantially straight rows greatly facilitates a more automatic removal of these small pieces, for example by a pick-up needle connected to a vacuum line. Furthermore the thickness of the foil may be less than that of a semiconductor wafer. Such reduction is advantageous when dividing the wafer into parts by fracturing using the bending moment roller method to be described hereinafter.

The plate may be divided along two intersecting sets of planes substantially perpendicular to the one major Surface of the foil and subsequently the foil extended omni-directionally in said plane.

The foil may be of an electrically insulating material, the plate and subsequently the said pieces being held thereon by electrostatic attraction. Advantageously, non-pre-stretched foil is used, which has a suitable electrostatic charge, to which the said pieces adhere during extension, while they can be removed readily from the foil after extension, for example by a hollow needle conneCted to a vacuum line. Thus, it is not necessary to use self-adhering foils and consequently the surface of the plate secured to the foil is not contaminated. This is particularly advantageous when the plate is a semiconductor wafer and the pieces semiconductor wafer parts, since even small quantities of impurities can adversely effect the characteristics and lifetime of semiconductor devices comprising such wafer parts. As a result, wafer parts separated by such a method according to this first aspect of the invention may not need any subsequent cleaning.

The foil may be extended by a tensioning force in said plane applied to peripheral portions of the foil and a simultaneous heating of the foil, the application of the tensioning force commencing prior to the application of heat. Such a method overcomes the disadvantage of sagging of the foil resulting from its prior heating. In this case the heating may be effected by irradiation of the opposite major surface of the foil. Such a method requires less irradiation and a lower temperature than the case in which the foil is irradiated on the same major surface as that on which are held the said pieces. This enables, for example, the overall temperature of the foil to be reduced by 50° C. for a "Genotherm 100" foil; at such a temperature the semiconductor pieces are not likely to adhere permanently to the foil. The tensioning force may be applied by securely mounting the foil in the jaws of a scroll chuck, the scroll of which is pre-tensioned, the foil being heated until it becomes extensionable and the chuck triggered, whereupon the jaws engaging with the scroll move radially outward so extending the foil radially in said plane. After extension by the applying said tensioning force and heating, the foil may be cooled and substantially retain its extended form and at least the portion of the extended foil having the said pieces held thereon may be severed from the remainder of said foil. In this case the material of the foil may be material available commercially under the Trade Mark "Genotherm 100."

After extension of the foil, the said pieces may be visually checked for damage or irregularities, the approved pieces then being removed from the foil and further processed.

According to a second aspect of the invention, a scroll chuck suitable for use in a method according to the first aspect of the invention comprises a substantially annular scroll and a plurality of jaws, symmetrically spaced grooved portions at one major plane surface of the scroll and inclined at an angle to radial directions of the scroll, each of the said jaws having a portion which engages with one of said portions, the scroll being axially rotatable whereby the said jaws are advanced and withdrawn along radial directions of the scroll substantially maintaining their axial concentricity, and means for applying to the scroll a tensioning force when the jaws are advanced beyond a certain distance along said radial directions.

Embodiments of the two aspects of the invention will now be described by way of example, with reference to the accompanying diagrammatic drawings, in which.

Figure 1:
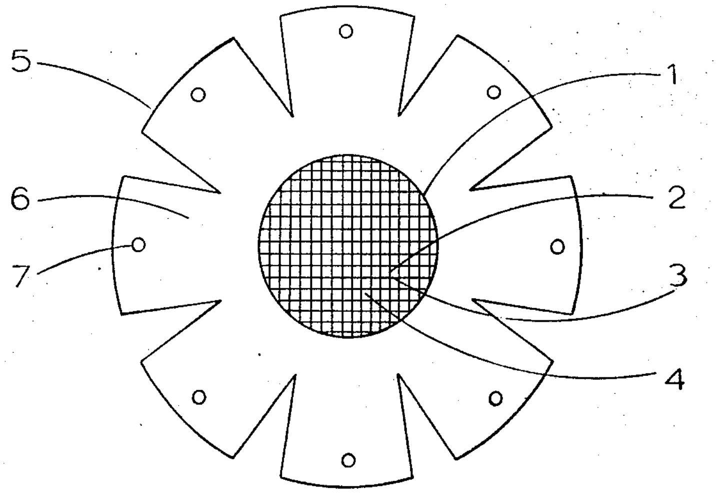
FIG. 1 is a plan view of a semiconductor wafer attached to a foil and suitable for separating into wafer parts by a method according to the first aspect of the invention.

FIG. 1 shows a semiconductor wafer 1 of 38 mm. diameter having on one major surface two perpendicular sets of diamond-scribed score lines 2 and 3 defining lines of separation between a plurality of wafer parts 4. The majority of the wafer parts 4 each comprise a semiconductor circuit element such as a transistor or integrated circuit. The other major surface of the water 1 is held by electrostatic attraction on the one major surface of non-pre-stretched foil 5 of material available commercially under the Trade Mark "Genotherm 100." Such a material is an electrically insulating synthetic resin. The foil 5 is substantially disc-shaped and has a maximum diameter of 103 mm. and a thickness of less than 0.12 mm. The wafer 1 is secured on the foil 5 prior to forming the sets of score lines 2 and 3.

The wafer 1 is sub-divided into the wafer parts 4 by a bending moment roller method. The one major surface of the wafer 1 is disposed on a resilient support. With the wafer 1 so supported, a roller is moved in relative motion with the wafer 1 under pressure over the opposite major surface of the wafer 1 and in contact with the opposite major surface of the foil 5. The motion of the roller is substantially perpendicular to one set of score lines 2. The roller exerts on the wafer 1 a bending moment which moves progressively along the wafer 1. Fracturing across the thickness of the wafer 1 is effected by said bending moment along each of the score lines 2 in turn. The wafer 1 is then re-orientated through 90° and in a similar way fracturing is effected along each score line 3 in turn. In this manner the wafer 1 is sub-divided into a plurality of separate, but unspaced, wafer parts 4.

Figure 3:
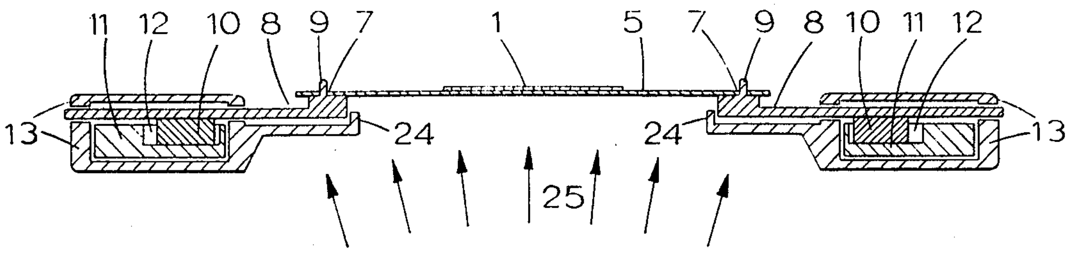
FIG. 3 is a cross-sectional view of the chuck of FIG. 2 along the line III—III of FIG. 2 during heating of the foil.
Figure 2:
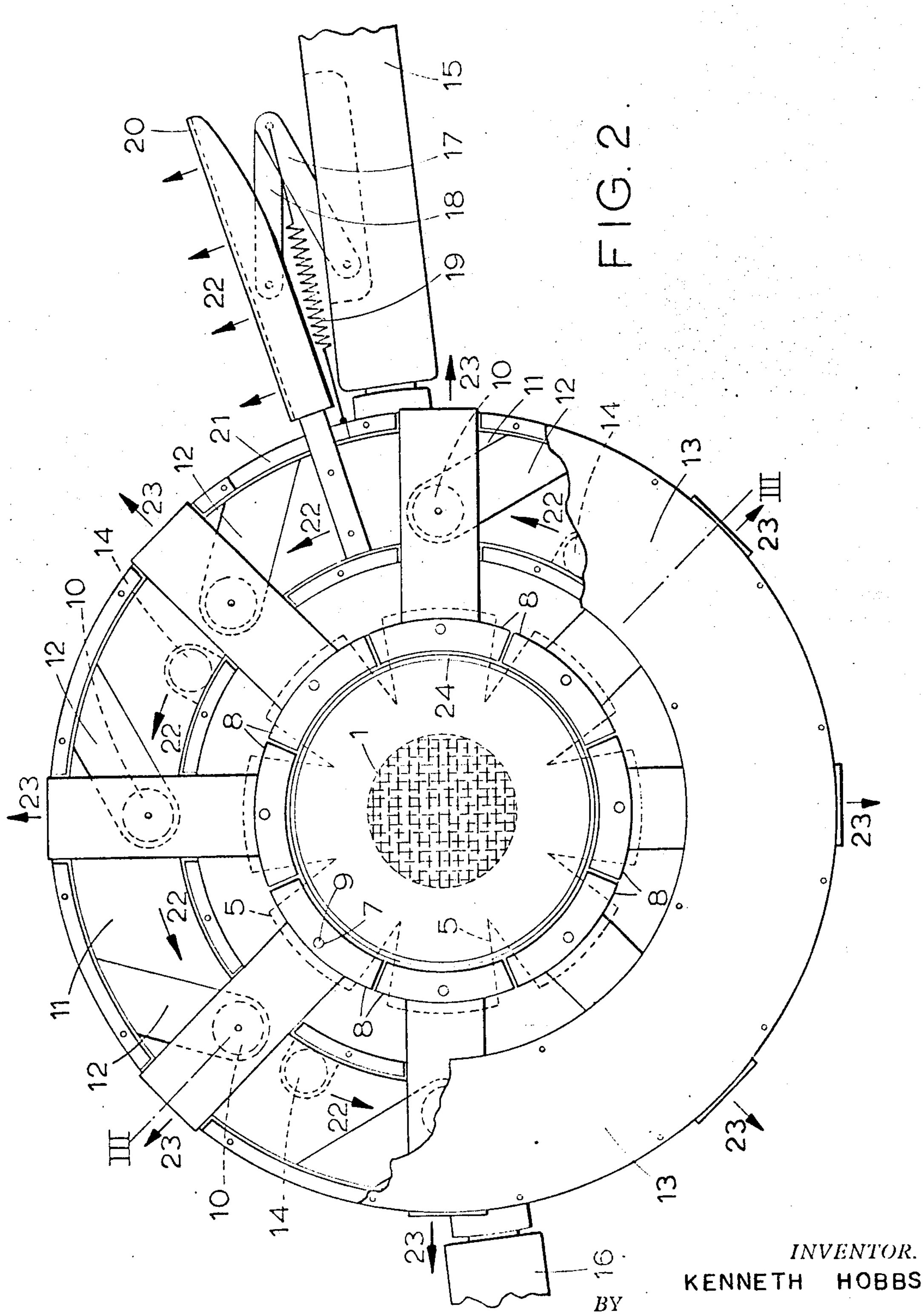
FIG. 2 is a plan view of a scroll chuck according to the second aspect of the invention, the wafer and foil of FIG. 1 being positioned on the chuck.

The wafer parts 4 held on the one major surface of the foil 5 are spaced apart from one another by extending the foil 5 substantially linearly in a substantially flat plane using the scroll chuck shown in FIGS. 2 and 3.

The substantially disc-shaped foil 5 has eight toothed portions 6 symmetrically spaced around its circumference. Each toothed portion 6 contains an aperture 7 suitable for securing the foil to eight jaws 8 of the scroll chuck. In FIG. 2 and FIG. 3 the foil 5 with the wafer parts 4 held thereon is shown mounted on the chuck. Each jaw 8 of the chuck is secured to a peripheral toothed portion 6 of the foil by the positioning of a peg portion 9 of the jaw in the aperture 7 of the toothed portion 6 of the foil 5.

In the plan view of FIG. 2 part of an upper casing 13 of the chuck is shown removed in order to show the interior of the chuck.

The scroll 11 of the chuck is of an annular configuration having eight grooved portions 12 symmetrically spaced on one major plane surface thereof. The grooved portions 12 are inclined at an angle of approximately 60° to radial directions of the scroll 11 and extended outwardly in a clockwise direction. Each jaw 8 has a portion with a ball bearing 10 on the underside thereof which engages with one of the grooved portions 12 of the scroll 11. The scroll 11 is rotatable in a casing 13 about its annular axis on four ball-bearings 14 symmetrically spaced in recesses on the opposite plane surface of the scroll. The ball-bearings 10 of the jaws 8 are so arranged with respect to the grooved portions 12 of the scroll 11 that, when the scroll 11 is axially rotated, the jaws 8 are advanced and withdrawn along radial directions of the annular scroll 11, substantially maintaining their axial concentricity.

The chuck is carried and held by means of handles 15 and 16 situated at opposite sides and along a diameter of the chuck. A trigger 20 is situated adjacent the handle 15 and passes through a recess 21 in the outer circumference of the casing 13. The recess 21 extends a distance along the outer circumference of the casing 13 so that the trigger 20 is capable of rotational movement through a small angle. Interior of the casing 13, the trigger 20 is attached rigidly to the scroll 11, so that by rotating the trigger 20 an operator holding the chuck can rotate the scroll 11 and hence advance or withdraw the jaws 8.

Between the handle 15 and the trigger 20 is a toggle and spring arrangement 17, 18 and 19. The spring 19 is connected between the knee of the toggles 17 and 18 and the outer circumference of the casing 13 so as to apply a substantially uniform tensioning force to the trigger 20. The ball-bearings 10 of the jaws 8, the grooved portions 12 of the scroll 11, the trigger 20 attached to the scroll 11, and the toggle and spring arrangement 17, 18 and 19 are such that, when by rotation of the scroll 11 the jaws 8 are advanced beyond a certain distance along radial directions, a tensioning force is applied to the scroll 11 and transmitted to the jaws 8.

The scroll 11 can be rotated so that the eight jaws 8 are fully advanced together forming a closed annular ring and touching an inner circular rim 24 of the casing 13. In this position, the jaws 8 have been advanced beyond this certain distance and the scroll 11 is tensioned by the spring and toggle arrangement 17, 18 and 19. The mutual spacing of the peg portions 9 of the jaws 8 now corresponds to the mutual spacing of the apertures 7 of the foil 5. Consequently it is with the jaws 8 in this position that the foil 5 with the wafer parts 4 held thereon is mounted on the chuck as shown in FIGS. 2 and 3, and held in a substantially flat plane. In this way, with the scroll 11 pre-tensioned, a tensioning force in said plane is applied to peripheral portions of the foil 5. It is this tensioning force that is subsequently used to extend the foil 5 substantially linearly in a substantially flat plane.

The approximate major dimensions of the chuck are as follows: The exterior diameter of the casing is 200 mm., and the diameter of the inner circular rim 24 of the casing 13 is 77.5 mm. The outer and inner diameters of the annular scroll 11 are 190 mm. and 133 mm. respectively. The length of the jaws 8 is 60 mm., the bearings 10 being situated 34 mm. from the inner edge of the jaws 8.

The scroll chuck having mounted thereon the unextended tensioned foil 5 with the wafer parts 4 held on the one major surface thereof is transferred to a heating apparatus (not shown). The opposite major surface of the foil 5 rests on the outer rim of a hollow base member.

The tensioned foil 5 is irradiated by switching on a heating lamp situated in the hollow base member. In this way, the major surface of the foil 5 opposite that on which are held the wafer parts 4 is directly heated by thermal radiation 25. The under portion of the casing 13 adjacent the inner rim 24 acts as a reflective guard so protecting the jaws 8.

The heating is continued for several seconds until the temperature of the foil 5 of "Genotherm 100" is such that it becomes extensionable. The scroll 11 of the chuck is pretensioned and was formerly maintained in such a tensioned state by the rigidity of the foil 5 held in the jaws 8 engaging with the scroll 11. When the foil becomes extensionable, the scroll 11 is free to rotate so that the chuck is triggered.

The trigger 20 moves away from the handle 15 in the direction shown in FIG. 2 by the arrow 22, the scroll 11 to which the trigger 20 is attached rotates about its annular axis in an anti-clockwise direction 22. Since the jaws 8 are constrained to move in radial directions, the bearings 10 attached to the jaws 8 and engaging with the channel portions 12 when the scroll 11 is rotated. As a result, the jaws 8 are withdrawn along radial directions 23, and the foil 5 is consequently extended radially in a substantially flat plane. The spring 19 also pre-tensions the foil 5 via the scroll 11 and the jaws 8 and so reduces to a minimum any slack or sagging in the foil 5 during extension.

Each jaw 8 of the chuck moves a distance of approximately 15 mm., so that the diameter of the foil 5 is increased during this extension from approximately 103 mm. to approximately 133 mm. The diameter of the portion of the one major surface of the foil 5 on which the wafer parts 4 are held increases from approximately 38 mm. to approximately 50 mm., so spacing apart the wafer parts 4, for instance by a distance of approximately 200 microns.

The extended foil 5 still mounted on the chuck is transferred from the heating apparatus to a trimmer. When the foil 5 is cool, its extension is maintained so that the wafer parts 4 are permanently spaced apart. Using the trimmer a central circular portion of the extended foil 5 of approximately 76 mm. diameter and having thereon the spaced wafer parts 4 is severed from the remainder of the extended foil 5. This circular foil portion is attached to a rigid carrier disc, and the wafer parts 4 are visually checked. Those wafer parts with damage or irregularities are externally marked by a suitable coloring agent. The approved semiconductor wafer parts are then removed from the foil portion by means of a pick-up head or a hollow needle having a sub-atmospheric connection, and are further processed at an area remote from the foil. Since the wafer parts 4 are spaced apart by a distance, for instance, of 200 microns, an approved wafer part can be detached from the foil without disturbing adjacent wafer parts.

The position and orientation of individual wafer parts 4 with respect to each other on the extended foil 5 is substantially the same as in the original semiconductor wafer 1. Consequently the approved wafer parts can be removed with a known orientation. In addition, since there is no curvature in a row of spaced wafer parts 4 on the extended foil 5, it is possible to process at high speed the foil 5 with wafer parts 4. The angular positions of only a few wafer parts on the extended foil 5 need be orientated with respect to the pick-up head. It is then possible, after such orientation, to move the foil portion in two orthogonal directions with respect to the pick-up head in order to remove the approved wafer parts.

I claim:

1. A device for extending a foil having a semiconductor wafer provided thereon, said wafer being divided into semiconductor elements so that during extension of the foil the semiconductor elements will be slightly spaced apart, comprising a substantially annular scroll plate arranged for rotational movement within a casing about a central axis, a plurality of groove portions arranged symmetrically about a major surface of said scroll plate which is perpendicular to said axis, said groove portions being oriented at an angle with respect to radial lines of the scroll plate, a plurality of jaw members symmetrically arranged about said scroll plate for radial displacement, means mounted on said jaw members in engagement with said groove portions so that when said scroll plate is rotated the jaw members will be caused to move in a radial direction in a substantially flat plan while maintaining axial concentricity with respect to each other, means attached to said scroll plate for causing rotation thereof so as to advance said jaw members toward each other, stop means associated with said casing at a position closest to said axis for stopping the inward advance of each jaw member at an exact advance position so that each jaw member is properly located, means connected to the means for causing rotation of the scroll plate for urging with a substantially constant force said plate to rotate in a direction which will cause said jaw members to be withdrawn from the advanced position, and securing means attached to each of said jaw members for securing said jaws to a portion of the periphery of said foil so that when said jaw members are withdrawn in the radial direction as a result of said urging means producing rotation of the scroll plate said foil will be extended and said semiconductor elements separated.

2. The device according to claim 1, wherein said securing means comprises an upstanding peg extending outside the main body of the casing for securing the foil thereto by positioning the peg in a corresponding aperture at peripheral portions of the foil.

3. The device according to claim 2, wherein the portion of each jaw which is adapted to hold a peripheral portion of the foil and which is situated outside the main body of the casing lies above and adjacent a flange portion of the casing, said flange portion projecting from the body of the casing towards the axis of rotation and being adapted to act as a reflective guard to protect the jaws and peripheral foil portions against thermal irradiation during an irradiation process in the extension of the foil.

4. The device according to claim 1, wherein said means on said jaw members in engagement with said groove portions are located within the casing and comprise a ball bearing which cooperates with the groove portions, and further comprising ball bearings in recesses in the opposite major surface of the scroll plate to obtain the bearing of the rotatable scroll plate in the casing.

5. The device according to claim 1 wherein the means for rotating the scroll plate comprises a trigger which is rigidly secured to the scroll plate, and the means for urging with a substantially constant force rotation of said scroll plate so as to withdraw said jaw members comprises a toggle and spring arrangement which acts on the trigger.

6. The device according to claim 1, wherein eight symmetrically arranged jaw members are provided, and the annular scroll plate has eight grooves symmetrically spaced around the one major surface of the scroll plate, said grooves being inclined at an angle of approximately 60° to radial directions of the scroll plate.

7. A device for extending a foil having a diced semiconductor wafer provided thereon so that the diced elements of the semiconductor will be slightly separated upon extension, said device comprising an annular scroll plate rotatably mounted within a casing, a plurality of symmetrically arranged grooves about one of the major surfaces of said scroll plate which surface is arranged at right angles to the axis of rotation of said scroll plate, said grooves being inclined at an angle of approximately 60° to radial directions of said scroll plate, a plurality of jaw members arranged symmetrically about the surface of said scroll plate, ball bearings mounted on each of said jaw members for co-operation with said grooves so that upon rotation of said scroll plate said jaw members will be caused to be displaced in a radial direction in a substantially flat plane while maintaining their axial concentricity, a trigger attached to said scroll plate for causing rotational movement thereof in a direction so as to cause advancement of said jaw members toward each other, spring means attached to said trigger for urging said scroll plate to rotate in an opposite direction so as to cause said jaw members to move in a radial direction away from each other, an upstanding peg attached to each of said jaw members and extending outside the main body of the casing for securing thereto a peripheral portion of said foil, a flange portion of the casing projecting from the body of the casing toward the axis of rotation so as to form a reflective guard for protecting the jaw members and the periphery of said foil from heat defamation during a heat-treating process in the extension of the foil, a rim of said flange extending therefrom so as to stop the inward advance of the jaw members upon rotation of said scroll plate in the direction for causing advancement, said rim causing the stopping of advancement at an exact advanced position so that each of said jaw members will be properly located with respect to the periphery of said foil for easy attachment of said foil thereto, whereby when said foil is attached to said jaw members by said upstanding pegs and heat has been applied thereto said spring means will urge said scroll plate to rotate in a direction for withdrawing said jaw members from each other so that said foil will be extended and the diced semiconductor elements separated from each other.

* * * * *

PO-1050
(5/69)

UNITED STATES PATENT OFFICE
CERTIFICATE OF CORRECTION

Patent No. 3,657,791 Dated April 25, 1972

Inventor(s) KENNETH HOBBS

It is certified that error appears in the above-identified patent and that said Letters Patent are hereby corrected as shown below:

In the Title under "Foreign Application Priority Data" delete "32,166/68" and insert --56,793/68--

Col. 2, line 7 "Same" should be --same-- line 59 "Surface" should be --surface-- line 68 "conneCted" should be --connected--

Claim 1, line 29, "advance" should be --advanced--

Signed and Sealed this 26th day of December 1972.

(SEAL)
Attest:

EDWARD M. FLETCHER, JR.
Attesting Officer

ROBERT GOTTSCHALK
Commissioner of Patents